United States Patent
Godard

[15] 3,668,418
[45] June 6, 1972

[54] SYSTEM FOR CONTROLLED CHARGING OF STAND-BY STORAGE BATTERIES THAT SUPPLY A LOAD ON FAILURE OF POWER SUPPLY TO THE LOAD FROM POWER MAINS

[72] Inventor: Pierre Godard, Livry-Gargan, France
[73] Assignee: Societe des Accumulateurs Fixes et de Traction (Societe Anonyme), Romainville, France
[22] Filed: Dec. 22, 1969
[21] Appl. No.: 887,198

[30] Foreign Application Priority Data
Oct. 1, 1969 France..................................6933547

[52] U.S. Cl..................................................307/66, 320/6
[51] Int. Cl.........................................................H02j 7/00
[58] Field of Search ....................307/43, 64, 65, 66; 320/6

[56] References Cited

UNITED STATES PATENTS

3,356,922  12/1967  Johnston..............................320/40 X
3,480,791  11/1969  Lesher......................................307/66
3,483,393  12/1969  Gutzmer et al. ..........................307/66

Primary Examiner—Herman J. Hohauser
Attorney—Kenyon & Kenyon Reilly Carr & Chapin

[57] ABSTRACT

A system for controlled charging of a stand-by storage battery that supplies a load in the event of failure of a.c. power supply mains including high and low rate charging means energized by power from the mains to supply charging current to the stand-by battery selectively at high or low rates. This system includes a memory storage cell or device of low capacity relative to the stand-by battery which is connected to be charged in response to flow of discharge current from the stand-by battery only during stand-by operation of said stand-by battery while power supply from the mains is interrupted. The extent of charge thus received by the memory storage cell is proportional to the current actually discharged by the stand-by battery only while and if it is operative and discharging into the load during mains power failure. Upon restoration of power in the mains, the proportionately charged memory storage cell is caused to discharge automatically at a constant rate until exhausted and the discharge current of the memory cell is used to control circuit means to effect automatically high-rate charging of the stand-by battery from the mains until substantial exhaustion of the proportionate charge of the memory storage cell occurs, whereupon low rate charging of the stand-by battery from the mains commences automatically.

19 Claims, 5 Drawing Figures

SYSTEM FOR CONTROLLED CHARGING OF STAND-BY STORAGE BATTERIES THAT SUPPLY A LOAD ON FAILURE OF POWER SUPPLY TO THE LOAD FROM POWER MAINS

RELATED APPLICATIONS

A related application Ser. No. 865,546 filed Oct. 13, 1969 is pending.

BRIEF SUMMARY OF INVENTION

The invention relates to recharging devices for stand-by storage batteries serving to supply a load in the event of breakdown of the normal power supply circuit from power mains. The aforesaid load (for instance, light-supplying lamps) may be a stand-by substituting for the normal load which latter is no longer supplied by the power mains. As a variant, the aforesaid load may be the normal load usually supplied by the power mains, to which load, in the event of a failure or an interruption of the supply from the mains, the storage battery is connected.

In the second case under consideration, the power supply mains are an alternating current network supplying the load with rectified current rectified by use of a suitable rectifier.

It is this rectifier that is used also for the recharging of the stand-by battery.

As a rule, devices are provided to maintain the stand-by storage batteries fully charged as a result of a charging system which, if permanent, is of moderate intensity. At the moment of occurrence of a power breakdown, the stand-by storage battery will take over the supply operation for a certain period during which it is being discharged and, the moment the restoration of power mains current recurs, the battery is automatically returned to charge, however, at a low rate, in order to become again fully charged. At this low rate, however, a very long charging period would be necessary and if a second power failure should occur shortly thereafter substantially full recharge of the battery had been effected, this might prevent in such event another required proper stand-by operation of the battery in view of the fact that the latter would not have become fully recharged when such need arose.

Systems have been provided to modify the rate of charge of the battery by increasing the intensity of the charging current during a certain time for the purpose of giving the battery as complete a charge as possible within a very short time.

Through French patent 1,211,651 (U.S. Pat. No. 3,040,182) there is known a direct voltage generator comprising an alternating current mains supplying a rectifier at the terminals of which there has been connected a battery of storage cells making possible the continuity of provision of direct current in the event of breakdown or failure of the normal AC supply. Such system comprises in addition a memory storage cell or device of a capacity that is low with respect to that of the stand-by storage battery and capable of charging itself with a constant intensity current $Ia$ (as shown by curve ($a$) of FIG. 1 described below in which the abscissae represents the intensity current $Ib$ supplied by the stand-by battery), from the stand-by storage battery during the shut-down time of the alternating current power supply mains; thus, the charge received by the memory storage cell is proportional to the shut-down time of the alternating current supply; this charge being used, the moment the alternating current supply is restored to permit recharging of the stand-by storage battery at a fast rate, by means of the charger; recharging of the stand-by battery of accumulators or storage cell being performed during the discharge time of the memory storage cell. Thus, the duration of the charge of the stand-by storage battery at a fast rate is equal to the duration of the discharge of the memory storage cell which is itself proportional to the duration of its charge which is in turn equal to the duration time of the breakdown of alternating supply current.

This system, even though it is an interesting one, is nevertheless attended by a certain lack of precision inasmuch as there does not always exist a proportionality between the ampere-hours charged during the rapid charge of the stand-by storage battery and the ampere-hours charged into the memory storage cell during the mains shut-down time: in fact, even if the charging current of the memory storage cell during the cut-out of the mains can be well defined, the discharge current of the stand-by battery is not always well defined, and the same holds true for that of its rapid charge in view of the fact that this charge restitution may occur during the terminal period of charge of the stand-by battery when the efficiency of this operation is at its poorest. It thus follows that, granted that there is a proportionality of time in the memory system defined above, there is, however, neither an identity nor even a proportionality of ampere-hours.

To improve this situation, another French patent 1,473,210 of Jan. 26, 1966 provides for a memory in the form of a memory storage cell which is being charged, on the one hand, proportionally to the time of the discharge of the main stand-by battery, hence the mains shut-down time, and on the other, proportionally to the current it discharges.

Figure 1:
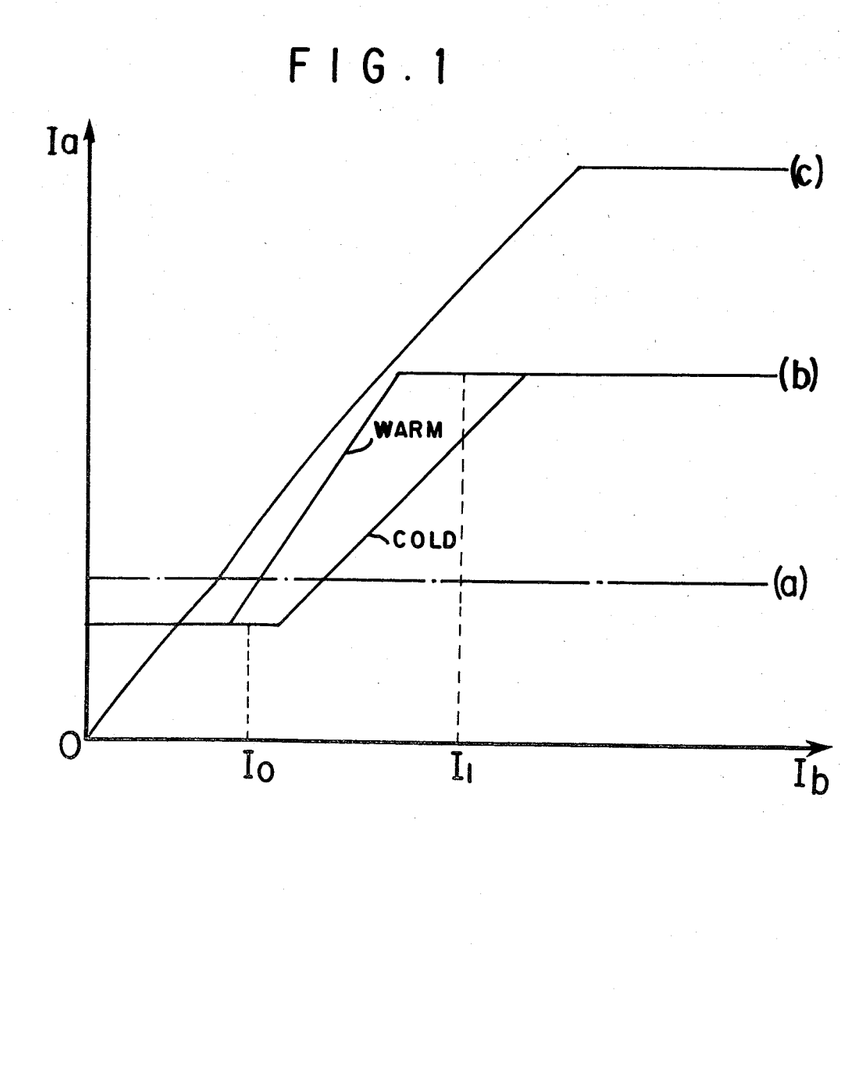
FIG. 1 depicts graphs of operational characteristics of the invention in comparison with known systems.

Nevertheless, in the system described in the latter patent, as shown by curve ($b$) of FIG. 1, with discharge currents of the stand-by storage battery that are below a limit of $Io$, The charging current of the memory storage cell stays constant and it is only with discharge currents of the stand-by storage battery that are in excess of $Io$ that the charging current of the memory storage cell is proportional to the discharge current of the stand-by storage battery.

Moreover, in view of the fact that the charging of the memory storage cell takes places, in the case of substantial recharge currents of the stand-by storage battery, via a transistor, the proportionality factor between the current discharged by the stand-by battery and the charging current of the memory storage cell is modified under the effect of temperature variations of said transistor, as well as the current limit $Io$ for putting the said transistor into operation. Of course, given a value $I_1$ of the discharge current of the stand-by battery, the aforesaid transistor is saturated and its resistance is minimal. In that case, the charging current $Ia$ of the memory storage cell reaches its maximum value and becomes constant.

Moreover, in both of the two systems just described each is attended by a drawback inasmuch as the charging of the memory storage cell is controlled by the absence of the mains line current. If it should happen that the stand-by storage battery would not be caused to supply current to a load during the period of absence of mains line current, it would nevertheless be subjected to the fast-charge rate during a period corresponding to said absence.

It is an object of the instant invention to provide a novel memory system that is free of the aforementioned drawbacks. To this end, it is an object of the instant invention to permit the creation of an image signal of the current discharged by the stand-by storage battery, and the integrating of said signal during time periods that do not necessarily coincide with the periods during which the main line current is absent, but with the periods during which the stand-by storage battery actually discharges. In the application contemplated hereinafter of the device according to the invention for supervising or monitoring the charging of a stand-by storage battery, the latter must be discharging, because the control signal is provided by this very discharge current. The system in accordance with the invention then reacts proportionally to said current discharged by said battery, no matter how weak that current may be, as can be seen from curve ($c$) of FIG. 1.

Another object of the instant invention is a device for the charging of a storage battery acting as a stand-by "emergency" supply for a load in the event of breakdown of a normal a. c. mains supply circuit, with current associated with a charger whose input terminals are connected to the said alternating current mains and whose output terminals are connected to the said stand-by battery, said charger having a fast and a slow charging rate, a memory storage cell having a low capacity by comparison with that of the stand-by storage battery which can be charged by the stand-by battery during the periods of breakdown or interruption of the alternating current supply from the mains and that controls during its discharge period, in a discharge circuit, the fast-charging rate of the stand-by battery of accumulators, characterized by the fact that it comprises means for establishing a voltage proportional to the current discharged by the stand-by battery into the load, and a DC electronic amplifier for the amplifying of said voltage and its conversion into a direct current the intensity of which is proportional to said voltage, irrespective of the value of said voltage, said direct current passing through the said memory storage cell for the purpose of charging it proportionally to the current discharged by the stand-by storage battery and only if the latter discharges into the load.

The invention will be readily understood by the description given below of two modes of realization of the invention with reference to the annexed drawing in which.

DETAILED DESCRIPTION

Figure 2:
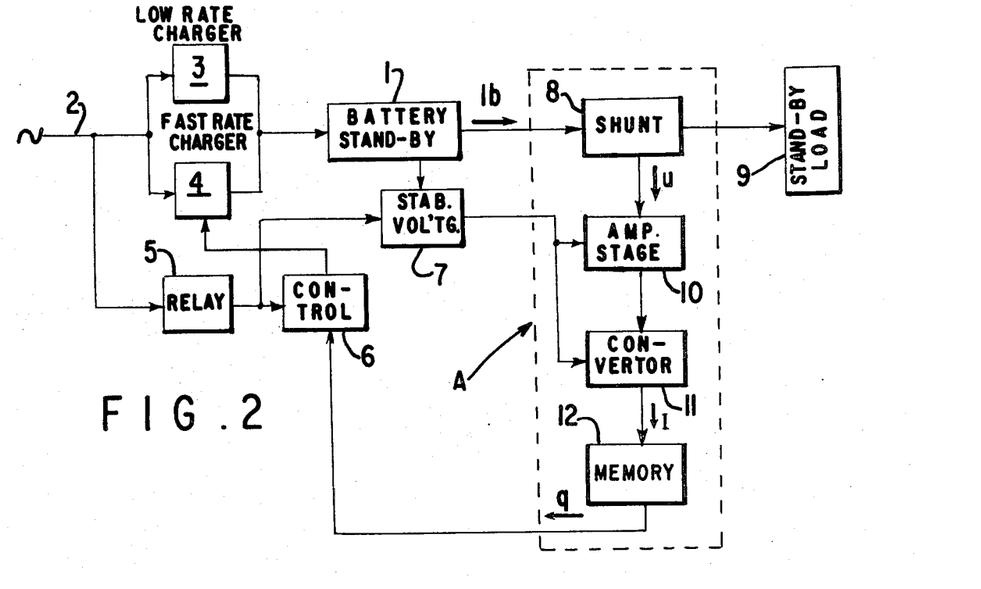
FIG. 2 represents a block diagram of a system embodying the invention.

In the block diagram of FIG. 2, there can be seen an alternating current mains 2 supplying via a charger 3–4 (3 being a low or maintenance-rate charger and 4 a fast-rate charger), a stand-by storage battery 1 designed to supply, in the event of mains failure or breakdown, a stand-by load 9 via a shunt 8.

Rectangle A (broken lines) shows the circuit for the creation and integration in time of a signal proportional to the current discharged by the battery 1 during stand-by operation.

Said circuit comprises, in addition to the shunt 8, a differential voltage amplifier 10, connected to a voltage-current converter 11 supplying a current to a memory storage cell or device 12 during the time of stand-by discharging operation of the battery 1.

The differential amplifier 10 and the voltage-current converter 11 are polarized by means of a stabilized voltage supply source 7; said stabilized voltage can be tapped from the battery 1 when the latter is discharging.

To this end, a relay 5, for the detecting of absence of current from the mains 2 controls the operation of the stabilized voltage supply source 7.

The memory storage cell or device 12 which is discharging during the operating periods of the stand-by storage battery 1 is connected to a control element 6 that permits, upon the reestablishment of the power at mains 2, the rapid recharging of the stand-by battery 1 via the charger 4.

Figure 3:
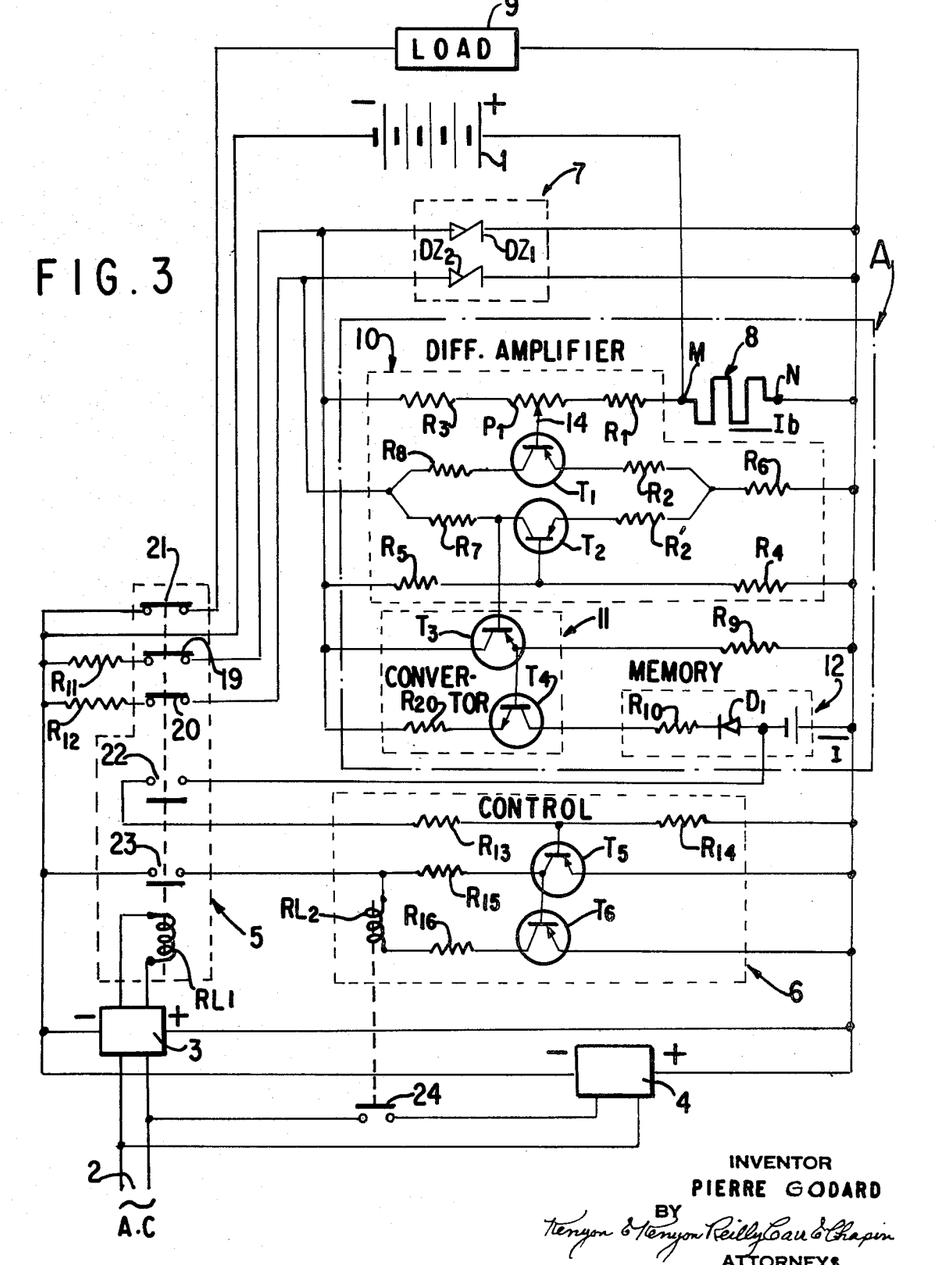
FIG. 3 represents a detailed wiring diagram corresponding to the block diagram of FIG. 2.

The detailed wiring diagram of FIG. 3 illustrates the system of the block diagram of FIG. 2. It shows the alternating current mains 2 supplying a stand-by storage battery 1 either normally and permanently via a charge-maintenance device 3 or, after a breakdown or another interruption of supply from mains 2, during which the battery discharged into a load 9, by means of a supplementary fast-charging device 4.

In addition, the rectangle A shows in dot-dash lines the circuit for the creation and integration of a current the intensity of which is proportional to that of the current discharged by the stand-by battery 1 into the load 9.

To this end there is shown, series-connected between the battery 1 and the load 9, the shunt 8 providing between its terminals M (connected to the positive pole of the battery 1) and N (connected to the load 9) a voltage proportional to the current discharged by the battery 1.

A monitored or controlled bridging contact 21 of a relay 5 is arranged between the load 9 and the negative terminal of the battery 1 and permits the supply of the load 9 from the battery in the event of power supply breakdown from mains 2.

The terminal M of the shunt 8 is connected to a divider bridge comprising the resistors $R_1$ and $R_3$ and the variable potentiometer $P_1$, the voltage at any selected point of the potentiometer being applied by a sliding contact 14 to the input of a voltage amplifier circuit 10 provided with temperature-compensated transistors $T_1$ and $T_2$.

The amplifier circuit 10 is of known design; it comprises two transistors $T_1$ and $T_2$ advantageously enclosed in the same housing so as to standardize or equalize their temperature. The base of the transistor $T_1$ is connected to the sliding contact 14 of the low-resistance potentiometer $P_1$. On the other hand, the base of the transistor $T_2$ is connected to the center point of a voltage divider composed of the resistors $R_4$ and $R_5$ respectively equal to resistors $R_1$ and $R_3$.

Stabilized voltages are tapped from the terminals of two Zener diodes $DZ_1$ and $DZ_2$, respectively, supplied with current by the battery 1 via resistors $R_{11}$ and $R_{12}$, respectively when bridging contacts 19 and 20 (normally open) are moved to closed condition. These stabilized voltages provide for the polarization of the transistors $T_1$ and $T_2$ the moment the battery 1 is discharging, i.e., upon an interruption of the power supply at mains 2. To this end, the two normally open bridging contacts 19 and 20 of the line-monitoring relay 5 are respectively connected in series with the resistors $R_{11}$ and $R_{12}$, said contacts being closed only in the event of the interruption of the alternating current supply in mains 2 which event de-energizes relay coil $RL_1$ of said relay 5.

The resistor $R_4$ is connected to the terminal N of the shunt 8, also is connected to the diodes $DZ_1$, $DZ_2$ and the resistors $R_3$ and $R_5$ are connected to the common connecting point of the diode $DZ_1$ and the resistor $R_{11}$ whenever bridging contact 19 is in closed condition.

The emitters of the transistors $T_1$ and $T_2$ are connected to the terminal N which is linked to the diodes $DZ_1$, $DZ_2$, and to the battery 1 via the resistors $R_2$, $R'_2$ and $R_6$. By means of the resistors $R_7$ and $R_8$ of identical value as resistors $R_2$ and $R'_2$, the collectors of the transistors $T_1$ and $T_2$ are connected to the common connecting point of diode $DZ_2$ and resistor $R_{12}$ whenever bridging contact 20 is in closing position.

The output of the amplifier 10 is connected to the input of an output amplifier 11 which is a voltage-current converter, comprising two transistors $T_3$ and $T_4$ respectively of the PNP and the NPN type and likewise housed in a common housing, which provide for the equalization of their temperatures. To reduce to a minimum the temperature drift of the amplifier 11, the PNP transistor $T_3$ controls the NPN transistor $T_4$ in such a way as to cancel the emitter-base threshold voltage variation of the transistor $T_4$ by an identical variation of the transistor $T_3$.

The polarization voltages of the transistors $T_3$ and $T_4$ are likewise tapped off from the respective terminals of diodes $DZ_1$ and $DZ_2$. The circuit of output amplifier 11 is arranged as follows: the base of its transistor $T_3$ is connected to the output of the amplifier 10, i. e. to the collector of transistor $T_2$, and the emitter of the transistor $T_3$ is connected via the resistor R9 to the shunt terminal N already connected with diodes $DZ_1$ and $DZ_2$. Its collector is connected to the common connecting point of resistor $R_{11}$ and diode $DZ_1$.

The base of the transistor $T_4$ is connected to the emitter of transistor $T_3$, its collector is connected through a memory-storage cell or device 12 via a diode $D_1$ and a resistor $R_{10}$ to the terminal N of shunt 8 with the diode $D_1$ blocking the discharge of the storage cell 12 into the circuit of the amplifier 11, and the emitter of transistor $T_4$ is connected, via a resistor $R_{20}$, to the common connecting point of resistor $R_{11}$ and diode $DZ_1$.

Under normal operation of the supply at mains 2, the coil $RL_1$ of the relay 5 is energized, bridging contacts 19, 20 and 21 then being maintained in open condition. The battery 1, therefore, does not discharge; it is then being charged at slow charging rate by means of the trickle charge of slow rate maintenance charging device 3; since the contacts 19 and 20 are then open, the amplifier circuits 10 and 11 are not polarized and consequently the memory storage cell 12 does not receive any charge.

The moment a failure occurs in supply of current from mains 2, the coil $RL_1$ becomes de-energized and the bridging contacts 19, 20, and 21 then move to circuit closing condition. By means of the closed bridging contact 21, the battery 1 then supplies the load 9.

Simultaneously, the then closed bridging contacts 19 and 20 permit the polarization of the amplifiers 10 and 11 via the stabilized voltage source diode $DZ_1$, diode $DZ_2$ supplied by the battery 1 via shunt 8 as long as the coil $RL_1$ of line monitoring relay 5 is de-energized resulting from and detecting an interruption of the power supply from mains 2, i.e. during a time $t$ that this interruption lasts, provided, of course, that this time $t$ does not exceed time $t_M$ of a complete discharge of the battery 1.

By way of example, the values of resistors $R_1$, $R_3$, $R_4$ and $R_5$ and the potentiometer $P_1$ can be adjusted in such a way that the bases of the transistors $T_1$ and $T_2$ will be at an identical potential the moment the shunt 8 is being traversed by a current equal to, e. g. one-half the rated discharge intensity of the battery 1. The current passing through the resistor $R_6$ is then divided equally between the resistors $R_7$ and $R_8$ and the collector potentials of the two transistors $T_1$ and $T_2$ then are equal. The shunt 8 is designed to provide only a very slight voltage drop in the order of 0.1 volt, for rated current intensity.

If, for example, a discharge current $Ib$ from the battery 1 into the load 9 flows through the shunt 8, the voltage drop at the terminals M and N of the shunt 8 is added to the stabilized voltage applied to the $R_1$-$P_1$-$R_3$ divider between the point M and the common connecting point of diode $DZ_1$ and resistor $R_{11}$. The voltage, therefore, between base-emitter of the transistor $T_1$ falls if current $Ib$ is higher than half the rated discharge intensity of the battery 1, and current flow diminishes in the transistor $T_1$; the voltage drop tends to become lower in the resistor $R_6$ and current flow increases in the transistor $T_2$ and in the resistor $R_7$. The potential applied to the base of the transistor $T_3$ then becomes more positive, i. e. its polarization diminishes. The transistor $T_3$, then controls the transistor $T_4$ which becomes more conductive as a result and a current I passes through memory storage cell 12 and charges it.

The transistor $T_4$ is polarized by the resistor $R_9$, and the transistor $T_3$ shunts all or part of the polarization current, depending on the state of the differential amplifier 10.

The resistor $R_{10}$ limits the maximum charging current of the memory storage cell 12 (especially in the event of substantial intensity peaks in the load).

The diode $D_1$ blocks the discharge of the memory storage 12 into the amplifier circuits 10 and 11 during the period when the voltages stabilized at the terminals of diodes $DZ_1$ and $DZ_2$ are inoperative during time supply from mains 2 is operative.

The memory storage cell 12 which is initially completely discharged is first charged with an amount of electricity It which is chosen so as to be of a capacity of the order of the double of $It_M$, which is the maximum charge corresponding to a complete discharge of the battery 1.

In brief, the shunt element 8 transforms the current $Ib$ (supplied by the battery 1 to the load) passing through it into a signal of a voltage $u$ strictly proportional thereto and which is available at its terminals M and N. The signal voltage $u$ is then amplified in amplifier 10 and subsequently reconverted and amplified into an intensity I in amplifier converter 11. Said intensity I is then directed into the memory storage cell 12 that performs its integration in this time and becomes charged by current I, proportional to the current $Ib$ discharged by the battery 1 into the load 9 via the shunt 8.

The memory storage cell 12 is connected to a discharge circuit comprising the resistors $R_{13}$ and $R_{14}$ via a bridging contact 22 likewise controlled by the coil $RL_1$ of the relay 5. This contact 22 is closed when coil $RL_1$ is energized. This discharge circuit is also connected to a control circuit comprising two transistors $T_5$ and $T_6$. The base of the transistor $T_5$ is connected to the common connecting point of resistors $R_{13}$ and $R_{14}$, and its emitter is connected to the terminal N of shunt 8. The collector of the transistor $T_5$ is connected, on the one hand, jointly to the maintenance charger 3 and to the fast charger 4 via a resistor $R_{15}$ and a normally closed bridging contact 23 controlled by the relay 5, and on the other hand, also directly to the base of the transistor $T_6$.

The resistor $R_{15}$ is likewise connected via a resistor $R_{16}$ and a coil $RL_2$ of a control relay 6 to the collector of the transistor $T_6$, the emitter of transistor $T_6$ being connected to the terminal N of shunt 8.

The coil $RL_2$ controls a bridging contact 24 making possible the supply of the fast charger 4 from the alternating current supply mains 2 when power is on.

The moment current re-appears or is restored in the supply mains 2, the relay coil $RL_1$ of the monitoring relay 5 is re-energized; the bridging contacts 19, 20, and 21 then open, thereby cutting off the current supply of the amplifiers 10 and 11 from the battery 1 and cutting the load 9 out of the circuit; simultaneously, the two other bridging contacts 22 and 23 of the relay 5 move to circuit closing condition.

Through the closed bridging contact 22, the memory-storage cell 12 then discharges into the resistors $R_{13}$ and $R_{14}$. This results in the polarization of the transistor $T_5$ which short-circuits that of the transistor $T_6$; the latter which is thus blocked then controls putting into operation the fast charger 4 at a heavy rate (fast charge). This control is performed by the relay coil $RL_2$ which, the moment it is not traversed by any current, will permit its bridging contact 24 to close, which permits the current supply of the charger 4 from the power main 2. It is, of course, understood that any other fast-charge system could be used within the framework of the instant invention.

Toward the end of the discharge of the memory storage cell 12, the transistor $T_5$ becomes blocked and this unblocks the transistor $T_6$. With the latter becoming conductive, the relay coil $RL_2$ of relay 6 becomes re-energized. This opens its bridging contact 24 and cuts off the rapid charge of the battery 1. Charging of battery 1 then continues to be provided at usual maintenance rate by the slow charger 3. The resistors $R_{15}$ and $R_{16}$ serve to limit the intensity of the current in the transistors $T_5$ and $T_6$, respectively.

Figure 4:
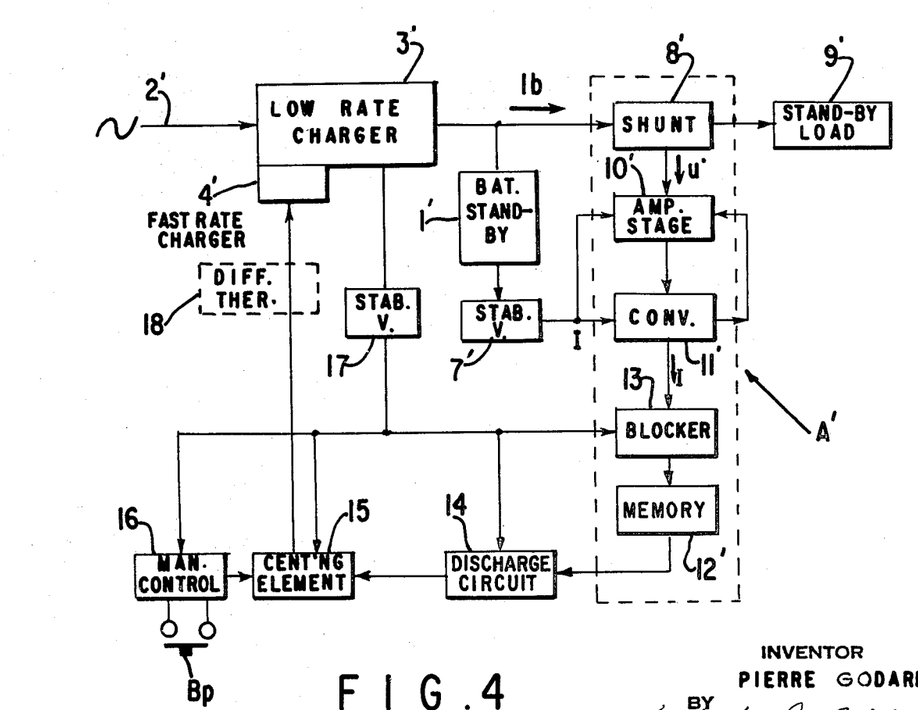
FIG. 4 represents a diagram of a variant of the system in accordance with the invention.

FIG. 4 illustrates a block diagram of a variant of the invention. In said figure, the elements identical to those of FIG. 2 bear the same reference characters as those used in FIG. 2 except that these are primed.

Thus, the alternating current supply mains 2 supplies via a charger 3' connected to a voltage level charging device 4' a stand-by storage battery 1'. The charger 3' provides for the maintaining of the battery 1' at full charge when the line supply 2' operates normally, i. e. while the battery 1' does not discharge into the load 9', while it provides for fast recharging of the battery under the effect of the fast charger 4' following a discharge of the battery into the load 9'. The battery 1' supplies the load 9' via the shunt 8' in the event of a breakdown or failure of the alternating current supply mains 1'; in this embodiment, the load 9' shown is the load that is normally being supplied by the mains 2'.

A voltage $u'$ available at the terminals of the shunt 8' when the load 9' is supplied by the battery 1' is amplified in an amplifier stage 10' connected to a current amplifier stage 11', said two amplifier stages being supplied by a source of stabilized current 7' tapped from the battery 1' when the latter discharges into the load 9'.

The amplifier stage 11' is connected to the memory storage cell 12' via a separator or blocker 13 that acts to render inoperative or cut off this charging current path as long as the supply voltage is available from mains 2'. Any other equivalent means to cut off its charge or make it inoperative may be used.

In the event of failure of the line voltage at mains 2', the separator or blocker 13 re-establishes a connection so that the discharge of the battery 1' can be recorded by the memory storage cell 12'.

A stabilized voltage source 17 supplied upon the presence of the line voltage in supply mains 2' by an auxiliary circuit, and which in turn supplies the separator or blocker 13 with voltage, a discharge circuit 14, a centralizing element 15, and a manually controlled delaying circuit 16 makes possible the omission of a relay sensitive to the presence of the line voltage similar to relay 5 of FIGS. 2 and 3.

If the supply at mains 2' is re-established following an interruption, said source 17, re-supplied, acts on the separator or blocker element 13 to cut off the charge circuit of the memory storage cell 12', and on the discharge circuit 14 and a centralizing element 15 in such a way that the discharge circuit 14 of the memory storage cell 12' transmits the information supplied by the memory storage cell 12' to the centralizing element 15 which then permits the operation at fast charge from the charging unit 3'-4'. This "approval" can be supplied also by the manually controlled delay element 16 by means of the push-button key $B_p$, via the element 15.

This delaying element 16 makes it possible to charge the battery 1' when the memory device 12' has not been charged as a result of a discharge of the battery 1'. This may be the case if the installation has for some time been disconnected from the mains 2' and the self-discharge of the battery 1' has not been compensated for by a maintenance charge from 3'.

A device 18 (dotted line) which is not indispensable for the putting into practice of the invention, which is, however preferably combined with it, is connected between the centralizing element 15 and the charger 3'-4'. This may be the device disclosed by copending application SN 865,546 filed on Oct. 13, 1969 entitled "Thermally responsive controlled charging arrangement for storage batteries". This said device 18 is a controlled charging arrangement for a storage battery, comprising means which, depending on the difference between ambient and battery temperatures, measured by means of probes, control the charging of the battery 1'.

The advantage of use of such a device 18 resides in the fact that it makes it possible under certain circumstances upon the charging of the battery at constant voltage, especially when the temperature of the battery is rather high, to interrupt the fast-rate charge the moment the battery has been charged, to avoid overcharging it.

Indeed, if the temperature is high, the charging current tends to be very high and then the complete discharging of the memory storage cell 12' might, under extreme conditions, cause an overcharging of the battery 1'. The device 18 may likewise be used with the delaying element 16 since the timing of the latter does not depend on the extent of discharge of the battery.

Figure 5:
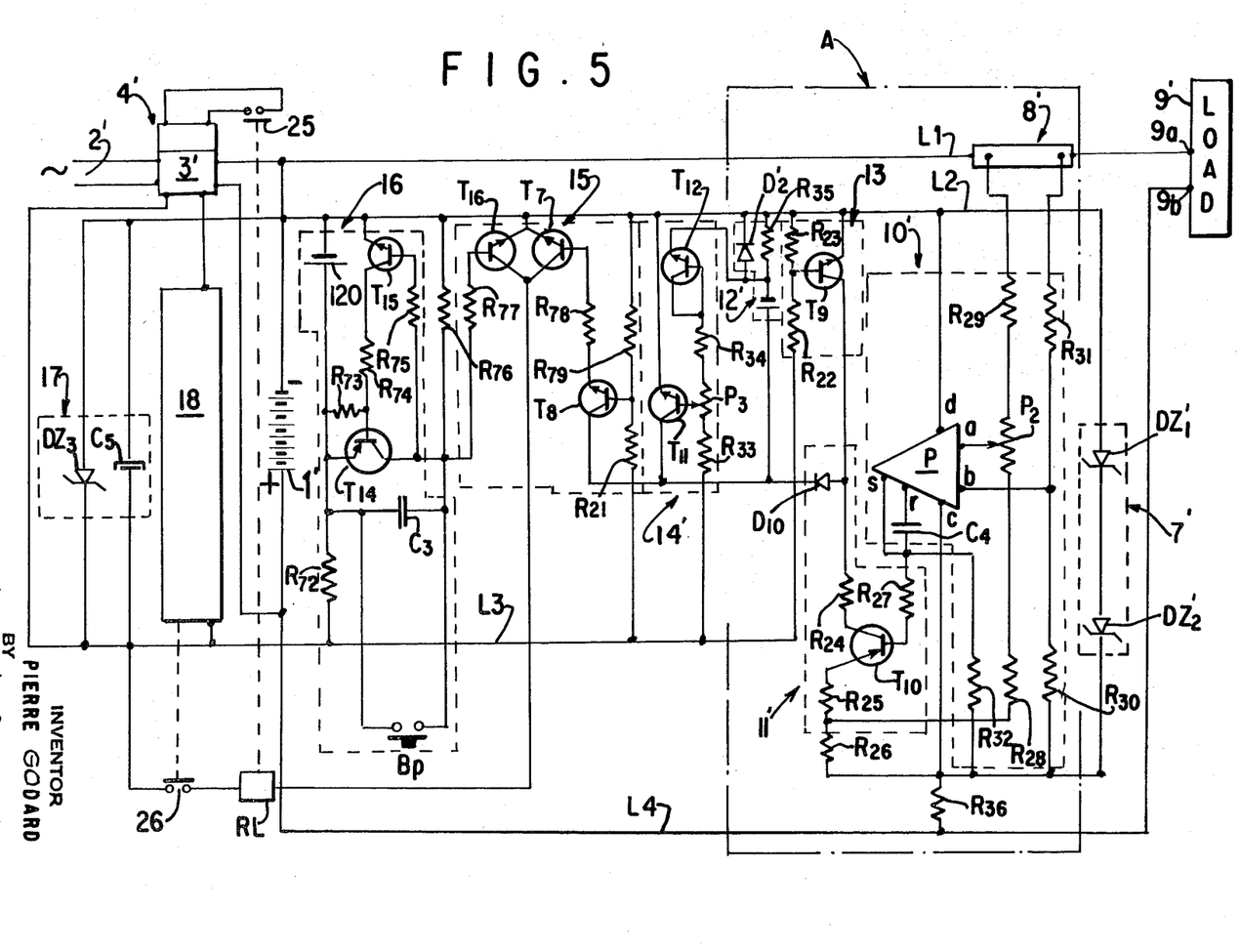
FIG. 5 represents a wiring diagram of the block diagram of FIG. 4.

FIG. 5 shows the circuitry of the system of FIG. 4, wherein the ac power supply mains 2' activates the charger 3'.

The battery 1' connected to the conduits L2 and L4, is connected to two output terminals of the charger 3' and it is likewise connected by conduits L1 and L4 to terminals 9a and 9b for connection to the load 9'.

In the load line L1 the shunt 8' is included a part of the voltage of which is applied to the inputs a and b of the amplifier stage 10' via the voltage divider formed by the resistors $R_{29}$, $R_{28}$ and the potentiometer $P_2$, and by the resistors $R_{26}$, $R_{30}$, and $R_{31}$.

This amplifier stage 10' is, in this instance, a high-gain integrated circuit thus making it possible to achieve elimination of one transistor in the following amplifier stage 11' (e.g. $T_3$ of FIG. 3). In addition to the inputs a and b, this amplifier stage 10' comprises one output s, two supply inputs c and d, and a re-injection input r.

The stage 11' comprises mainly the transistor $T_{10}$ the base of which is connected to the output s of the amplifier 10' via the resistor $R_{27}$. Its emitter is connected to the Zener diodes $DZ'_2$, $DZ'_1$, forming the source of stabilized voltage 7', via resistors $R_{25}$ and $R_{26}$. Its collector is connected to the low-capacity memory accumulator 12' (low capacity with respect to the battery) via the resistor $R_{24}$ and the diode D10, and to the other terminal of the stabilized voltage source 7' (formed by the Zener diodes $DZ'_1$ and $DZ'_2$) via the resistor $R_{24}$ and the collector-emitter junction of the transistor $T_9$ that forms the main part of the separator or blocker stage 13.

The source of stabilized voltage 7' formed by the Zener diodes $DZ'_1$ and $DZ'_2$ is supplied by the battery 1' via lines L2 and L4 and the resistor $R_{36}$, and also supplies the integrated amplifier stage 10' via the inputs c and d.

The condenser $C_4$ is intended to prevent the likelihood of the occurrence of auto-oscillations of the amplifier stage 10'.

The resistor $R_{32}$ makes possible a more reliable blocking of the transistor $T_{10}$ in the event of the absence of a voltage signal at the terminals of the shunt 8'.

The transistor $T_9$ forming the main part of the separator or blocker stage 13 is polarized by the resistors $R_{22}$ and $R_{23}$ at the terminals of a Zener diode $DZ_3$ forming the source of stabilized voltage 17 supplied by the auxiliary output terminals of the charger 3', which are connected to the conduits L2 and L3. Stabilized voltage source 17 is completed by a shunting condenser $C_5$ providing for the filtering of the voltage supplied by said source 17.

The memory storage cell 12' receives its charging current from the battery 1' as has been shown, via the stabilized voltage source 7', the voltage of which is transmitted by the amplifier stage 11' (transistor $T_{10}$), with a diode $D'_2$ which shunts a resistor $R_{35}$ completing the charging circuit of said memory storage cell 12'. It is discharged into the discharge circuit 14 by a special discharge circuit composed of the resistor $R_{35}$ and a transistor $T_{11}$ the emitter voltage of which is fixed by said resistor $R_{35}$ and whose base polarization is provided by the resistors $R_{33}$, $R_{34}$ and a variable potentiometer $P_3$. This special discharge circuit constituted essentially of a transistor $T_{11}$, the emitter of which is polarized by a resistor $R_{35}$ traversed by the discharge current of said memory storage cell 12', has the effect of supplying a constant current discharge, which was not the case with the system shown in FIG. 3 (in which the memory-storage cell was discharged mainly into the resistors $R_{13}$ and $R_{14}$ thereof). However, a discharge at constant current has the effect of supplying in all instances a very clear-cut discharge termination. A transistor $T_{12}$ connected like a diode, the collector and base of which are commonly connected to the resistor $R_{34}$ and the emitter of which is connected to the memory storage cell 12', acts as a temperature-compensating element for the transistor $T_{11}$, with their junction voltages obeying a law of identical variation the moment the temperature varies. A second discharge circuit of the memory storage cell 12' transmits a signal to the base of a transistor $T_7$ and is formed by the collector-emitter circuit of a transistor $T_8$, polarized by resistors $R_{79}$ and $R_{21}$ connected across the terminals of the stabilizing voltage source 17 and a resistor $R_{78}$.

The transistor $T_7$ itself constitutes a part of the centralizing element 15 that authorizes or controls the actuation of the fast-charging device 4' which raises the voltage of the charger 3'. In FIG. 5, there is shown, by way of example, a relay RL, connected to the collector of transistor $T_7$, the bridging contact 25 of which controls the actuation of the charge voltage raising device 4'. It would be possible to substitute a transistor circuit for the relay RL. The circuit of the centralizing element 15 is completed by a second bridging contact 26 or an equivalent element controlled by the temperature differential response device 18 referred to above which makes it possible to stop the fast-charge of the battery 1', for example, as a function of the temperature of the said battery.

The centralizing element 15 also comprises another transistor T16 the emitter and collector of which are mounted in parallel with the emitter and the collector of transistor $T_7$. Said transistor $T_{16}$, just as transistor $T_7$, authorizes the fast-charging of the battery, however, it is controlled by the delaying circuit 16 of FIGS. 4 and 5. Said delaying circuit 16 is composed of an storage cell 120 (of low capacity) which will be charged if power is present in mains 2' by the stabilized voltage source 17 via a resistor $R_{72}$. Said storage cell 120 discharges into the resistors $R_{75}$, $R_{76}$, and $R_{77}$, either via the emitter-collector/circuit of a transistor $T_{14}$ or via the circuit of the pushbutton $B_p$ across the terminals of which there is a condenser $C_3$. The resistor $R_{77}$ polarizes the transistor $T_{16}$. The transistor $T_{14}$ is polarized by a transistor $T_{15}$ by means of a resistor $R_{74}$ which is connected to the collector of $T_{15}$ while the emitter of the latter is connected to one of the terminals of the accumulator 120. The resistor $R_{75}$ is connected to the base of $T_{15}$. A resistor $R_{73}$ shunts the emitter-base circuit of the transistor $T_{14}$.

In the operation of the device shown in FIG. 5, three cases can be differentiated:

1. ABSENCE OF POWER LINE VOLTAGE AT MAINS 2'.

If the battery 1' does not discharge into the load 9', the shunt 8' does not show any voltage drop, and the output voltage at s of the amplifier stage 10 is inadequate to polarize the transistor $T_{10}$ so that the memory storage cell 12' does not receive any charging current.

The moment the battery 1' discharges into the load on occurrence of a main power line failure, the shunt 8' has a voltage appearing across its terminals that is amplified by amplifier stage 10' and polarizes the transistor $T_{10}$ more or less as a function of the value of said voltage across the terminals of the shunt 8' in such a way that the memory storage cell 12' receives a charging current proportional to said voltage and defined by the resistor $R_{25}$ and the amplifier stage output voltage. The resistor $R_{24}$ limits the charging current to accumulator 12' to a specified maximum value, the moment high current peaks exceed the rating of the shunt 8'.

The resistor $R_{26}$ through which the charging current of the memory-accumulator 12' is passing defines a voltage drop that is reinjected at the input terminal a of the amplifier 10' thereby determining the gain of said amplifier stage 10'. This counter-reaction eliminates the effects of the temperature variations to which the transistor $T_{10}$, the Zener diodes $DZ'_1$ and $DZ'_2$, and the amplifier stage 10' are likely to be subjected.

2. VOLTAGE RETURNS TO THE MAINS 2'.

At that moment, the stabilized voltage 17 (Zener diode $DZ_3$) is supplied and the transistor $T_9$ is polarized by the resistors $R_{22}$ and $R_{23}$ and shunts the current supplied by the amplifier stage 10'. The diode $D_{10}$ prevents the discharging of the memory storage cell 12' through $T_9$. The memory storage cell 12' then discharges at a constant intensity by virtue of the fact that the emitter-collector junction of the transistor $T_{11}$ is series-connected with the resistor $R_{35}$ along the discharge path of storage cell 12' and that the polarization of the base of said transistor $T_{11}$ has been suitably regulated by adjustment of potentiometer $P_3$. The storage cell 12' at the same time polarizes the transistor $T_7$ by means of the resistor $R_{78}$, by passing current through the transistor $T_8$ which is rendered conductive through the energization of the source 17. The transistor $T_7$ that has been rendered conductive then energizes the relay RL (bridging contact 26 being closed) which thus closes the bridging contact 25 and the battery 1' is put under charge at the high voltage level (high charging rate).

This charge lasts as long as the transistor $T_7$ is conductive and the control 26 remains closed.

The transistor $T_7$ remains conductive as long as the voltage of the memory storage cell 12' is adequate to provide its polarization and as long as transistor $T_8$ remains conductive by virtue of the presence of the power supply in mains 2'. The open or closed condition of bridging contact 26 is controlled by the temperature compensating device 18 that is capable of cutting off the charge at high-voltage level as a function, for instance, of the battery temperature level.

The moment the memory storage cell 12' is discharged, its voltage becomes insufficient to maintain the polarization of transistor $T_7$, and the bridging contact 25 opens since at such time the relay RL is no longer energized. Then, charge of battery 1' is only from maintenance charge 3'.

3. MANUALLY CONTROLLED CHARGING OF THE BATTERY

The battery can be charged under manual control without charging the memory storage cell 12' and the period of the charge at high voltage will be determined by the storage cell 120. To that effect, depression of the pushbutton $B_p$ is effected and short circuits the emitter-collector junction of transistor $T_{14}$. Since the accumulator 120 discharges into the resistors $R_{75}$ and $R_{76}$ the transistor $T_{16}$ becomes conductive and the relay RL is energized. The polarization of the transistor $T_{14}$ is maintained by the transistor $T_{15}$ via the resistor $R_{74}$ the moment the push-button $B_p$ is released. Charging stops when the storage cell 120 no longer has a voltage adequate to polarize the transistors $T_{14}$, $T_{15}$ and $T_{16}$.

Variations are, of course, possible in the systems disclosed within the scope of the appended claims. No intention of limitation to the exact abstract or specific embodiments described exists.

What is claimed is:

1. That improvement in load supplying systems wherein a load is alternatively supplied either by power mains or by a stand-by storage battery upon occurrence of power failure at the mains comprising a storage battery recharging system for charging the battery selectively at high and low charge rates, a memory storage cell of low capacity relative to the stand-by storage battery, means for charging the memory storage cell to an extent directly proportional to the total amount of current discharged by the stand-by storage battery while the latter is supplying current into the load during power failure at the mains, said means comprising a shunt circuit including a shunt resistor through which a portion of the total current discharged into the load by the stand-by battery at all times passes during discharge of the stand-by battery to provide a potential across said resistor directly proportional to the total current passing through said resistor, means for stabilizing and amplifying said potential and applying it to said memory cell to thereby charge said memory cell proportionately to the total current discharged by the stand-by storage battery, and means responsive to discharge of the proportionately charged memory cell on restoration of power supply at the mains to institute and maintain high rate charging of the stand-by storage battery from said mains for a period of time that is a function of the total proportionate charge received by the memory cell from the total quantity of current actually discharged by the stand-by battery into the load and means for thereafter establishing low rate charging of said stand-by battery from the mains.

2. That improvement in load supplying systems according to claim 1 including a stabilized voltage source energized by said storage battery to supply a polarizing control current to said amplifying means that provides for charging of said memory storage cell when failure of power supply at the mains occurs.

3. That improvement in load supplying systems according to claim 1 including monitoring means controlled by discharge of said memory storage cell and sensing means responsive to restoration of power supply in the power mains after failure monitored by said monitoring means to effect charging of the storage battery at high rate upon such restoration of power supply in the mains.

4. That improvement in load supplying systems according to claim 1 wherein said stabilizing and amplifying means comprises a first symmetrical transistorized differential amplifier provided with automatic compensation for temperature variations and transistorized conversion means for the amplified voltage also provided with compensation for temperature variations, and a stabilized voltage source energized by said storage battery to supply a polarizing control current for said voltage amplifying means, said stabilized voltage source comprising Zener diodes connected to terminals of said storage battery.

5. That improvement in load supplying systems according to claim 3 wherein said sensing means comprises a relay responsive to presence of power supply in the power mains and said monitoring means comprises a second relay responsive to presence of discharge from said memory storage cell.

6. That improvement in load supplying systems according to claim 2 including a circuit means supplied by a second stabilized voltage source supplied by the power mains to prevent charging of said memory storage cell while power supply exists in the mains, and also including a centralizing system authorizing fast rate charging of the storage battery from the mains whenever discharge of the memory storage cell is effected.

7. That improvement in load supplying systems according to claim 6 including means to effect discharge of the memory storage cell at a substantially constant value.

8. That improvement in load supplying systems according to claim 1 wherein said stabilizing and amplifying means comprises a high-gain integrated amplifier circuit whose input terminals are connected to receive a fraction of the voltage across the shunt, resistor means to reinject into said circuit a voltage drop proportional to said current charging the memory storage cell to fix the gain of said amplifier circuit and to eliminate effect of temperature variations, transistorized conversion means for the amplified voltage of said voltage amplifier means comprising two Zener diodes connected to the storage battery and a transistor polarizable by said two Zener diodes, and circuit means to prevent charging of the memory storage cell while power is supplied by the mains, said last named circuit means comprising other Zener diodes connected to be supplied by the power mains and a transistor polarizable by said other Zener diodes.

9. That improvement in load supplying systems according to claim 8 including also a centralizing system comprising a relay controlling transistor and a relay connected thereto, said last named transistor being rendered conductive by simultaneous presence of power in the mains and of a discharge current from the memory storage cell.

10. That improvement in load supplying systems according to claim 7 wherein said means to effect discharge of the memory storage cell at substantially constant value comprises a discharge circuit including a transistor and a resistor connected for passage through it of discharge current from the memory storage cell, said last-named transistor having an emitter which is polarizable by the discharge current passing through the resistor.

11. That improvement in load supplying systems according to claim 1 wherein said storage battery recharging system for charging selectively at high and low charge rates includes means for effecting charging at the selected rates at respective different constant voltages, and temperature sensitive means for controlling the time of high rate charging of the storage battery as necessary.

12. That improvement in load supplying systems wherein the load is alternatively supplied by power mains and by a stand-by storage battery upon occurrence of failure at the power mains comprising a storage battery recharging system including means to charge the battery selectively at fast high rate and means to charge the battery at slow low rate from the power mains, means to control automatically the fast high rate charging time, said last-named means comprising a memory storage cell connected to be charged by the storage battery only while the latter is discharging into the load on occurrence of power failure and proportionately to the total amount of electricity actually discharged by the storage battery into the load, and circuit means for delivering discharge current from the proportionately charged memory storage cell to activate the high rate charging means of the storage battery upon restoration of power supply in the mains, an additional low capacity storage cell connected to be maintained in charged condition by power from the power mains and connected to the high rate charging means to activate the latter upon discharge of such low capacity storage cell and serve as an additional control for establishing fast high rate charging of the storage battery, and manual control means connected for effecting such discharge of said additional low capacity storage cell.

13. That improvement in load supplying system according to claim 1 wherein said means for charging the memory storage cell comprise transistors and wherein said means responsive to discharge of current of the charged memory storage cell on restoration of power supply at the mains also includes transistors.

14. That improvement in load supplying systems according to claim 13 include temperature compensation means for all said transistors.

15. That improvement in load supplying systems wherein the load alternatively is supplied by power from power mains, and by a stand-by storage battery upon failure of power supply from the mains comprising a storage battery recharging system for charging the battery from the mains selectively at a high and low charge rates and comprising a memory storage cell of low capacity relative to that of the storage battery, circuit means including transistors connected for effecting charging of the memory storage cell by discharge current from the storage battery and proportionately to the total amount of current discharged therefrom while the latter is supplying the load on failure of power from the mains, circuit means including transistors connected between the memory storage cell and said battery recharging system to permit discharge current flow from the proportionately charged memory storage cell on restoration of power supply in the mains to activate said storage battery charging system to high charge rate until discharge current flow from said proportionately charged memory storage cell substantially ceases, and means to thereafter re-establish low charging rate of the storage battery from said recharging system.

16. That improvement in load supplying systems according to claim 15 including relay means to cut off supply of the load by the storage battery while power is being supplied by the mains.

17. That improvement in load supplying systems according to claim 15 including also circuit means comprising transistors and a relay connected to the battery recharging system to discontinue automatically its charging at high rate and effect restoration of charging at low rate at substantial cessation of discharge current flow from said memory storage cell.

18. That improvement in load supplying systems according to claim 15 including means responsive to storage battery temperature and switching means operated thereby to change said battery recharging system from high rate to low rate charging irrespective of the charge condition of said memory storage cell when the storage battery temperature exceeds a determined value during high rate charging thereof.

19. That improvement in load supplying systems wherein a load is alternatively supplied either by power mains or a stand-by storage battery upon occurrence of power failure at the mains, comprising a storage battery recharging system for charging the battery selectively at high and low charging rates, a memory storage device of low capacity relative to the stand-by storage battery, means for charging said memory storage device to an extent directly proportionate to the total amount of current discharged by the stand-by battery while the latter is supplying current into the load during power failure, and automatic means responsive to operation of the proportionately charged memory storage device effective on restoration of power supply at the mains automatically to initiate and maintain high rate charging of the stand-by battery from said mains for a period of time that is a function of the total charge received by the memory storage device during actual discharge of the stand-by battery, and means for thereafter establishing low rate charging of said stand-by battery from the mains.

* * * * *